US008121646B2

(12) United States Patent
Oren et al.

(10) Patent No.: US 8,121,646 B2
(45) Date of Patent: Feb. 21, 2012

(54) METHOD AND SYSTEM FOR EQUALIZING CABLE LOSSES IN A DISTRIBUTED ANTENNA SYSTEM

(75) Inventors: Yair Oren, Washington, DC (US); Igor Berlin, Potomac, MD (US); Ofer Saban, Meshek (IL)

(73) Assignee: Corning MobileAccess Ltd, Airport (IL)

( * ) Notice: Subject to any disclaimer, the term of this patent is extended or adjusted under 35 U.S.C. 154(b) by 1070 days.

(21) Appl. No.: 12/016,459

(22) Filed: Jan. 18, 2008

(65) Prior Publication Data

US 2008/0174502 A1 Jul. 24, 2008

Related U.S. Application Data

(60) Provisional application No. 60/885,470, filed on Jan. 18, 2007.

(51) Int. Cl.
*H04M 1/00* (2006.01)
(52) U.S. Cl. ............... 455/562.1; 455/67.11; 455/226.1; 455/226.4; 455/115.1; 455/115.4
(58) Field of Classification Search .................. 455/126, 455/127.1, 127.2, 575.1, 575.7, 550.1, 552.1, 455/553.1, 554.2, 560, 138, 232.1, 234.1, 455/234.2, 248.1, 251.1, 263, 562.1, 278.1, 455/226.1, 277.1, 277.2, 303, 67.11, 115.1, 455/115.4, 226.4, 67.16, 67.13; 375/226
See application file for complete search history.

(56) References Cited

U.S. PATENT DOCUMENTS 5,339,184 A 8/1994 Tang
(Continued)

FOREIGN PATENT DOCUMENTS

EP 0355328 A2 2/1990
(Continued)

OTHER PUBLICATIONS

International Search Report for PCT/US2008/002226 mailed Aug. 21, 2008, 3 pages.
(Continued)

*Primary Examiner* — Pablo Tran
(74) *Attorney, Agent, or Firm* — C. Keith Montgomery (57) ABSTRACT

The invention is directed to a method and system for equalizing the signal losses over cable runs in a Distributed Antenna System (DAS). In a DAS, two or more antennae are connected to the system by cable runs that can vary widely in length. As a result, the signal loss over a given cable run can also vary widely which can impact the design and deployment of the DAS and reduce antenna spacing. In addition, for a broadband DAS that supports many frequency bands or ranges using a common antenna unit, the signal losses vary with respect to frequency further making it difficult to equalize the cable losses. According to one embodiment of the invention, the method and system provide for measuring and adjusting the signal losses of each cable run to be a predefined value. According to another embodiment of the invention, the DAS can include a hybrid passive-active antenna unit which includes a frequency multiplexer that separates the signal into frequency bands or ranges that are connected to an antenna element associated with a particular frequency band or range. Where a single frequency band needs to be amplified (or attenuated), a single band amplification block (SBAB) can be inserted in the connection between the frequency multiplexer and the antenna element to amplify (or attenuate) the desired frequency band. Where more than one frequency band need to be amplified (or attenuated), a multiband amplification block (MBAB) can be inserted in the connection between the frequency multiplexer and the appropriate antenna element to amplify (or attenuate) the desired frequency bands.

23 Claims, 11 Drawing Sheets

U.S. PATENT DOCUMENTS

| | | | |
|---|---|---|---|
| 5,502,446 A | 3/1996 | Denninger | |
| 5,809,395 A | 9/1998 | Hamilton-Piercy et al. | |
| 6,049,705 A | 4/2000 | Xue | |
| 6,198,432 B1 | 3/2001 | Janky | |
| 6,374,124 B1 | 4/2002 | Slabinski | |
| 6,430,416 B1 | 8/2002 | Loomis | |
| 6,895,249 B2 | 5/2005 | Gaal | |
| 6,914,539 B2 | 7/2005 | Hoctor et al. | |
| 6,920,192 B1* | 7/2005 | Laroia et al. | 375/347 |
| 7,023,382 B1 | 4/2006 | Akano | |
| 7,039,135 B2* | 5/2006 | Binshtok et al. | 375/346 |
| 7,123,939 B1 | 10/2006 | Bird et al. | 455/561 |
| 7,132,979 B2* | 11/2006 | Langenberg | 342/368 |
| 7,251,459 B2* | 7/2007 | McFarland et al. | 455/101 |
| 7,554,964 B2 | 6/2009 | Bolgiano et al. | |
| 7,680,462 B2* | 3/2010 | Wong et al. | 455/78 |
| 7,869,828 B2* | 1/2011 | Wang et al. | 455/561 |
| 7,937,110 B2* | 5/2011 | Wu et al. | 455/561 |
| 2001/0016504 A1 | 8/2001 | Dam et al. | |
| 2003/0148747 A1* | 8/2003 | Yamamoto | 455/234.1 |
| 2004/0100930 A1 | 5/2004 | Shapira et al. | |
| 2004/0102196 A1 | 5/2004 | Weckstrom et al. | |
| 2006/0056283 A1 | 3/2006 | Anikhindi et al. | |
| 2006/0128425 A1 | 6/2006 | Rooyen | |
| 2006/0223577 A1 | 10/2006 | Ouzillou | |
| 2006/0262014 A1 | 11/2006 | Shemesh et al. | |
| 2006/0276227 A1 | 12/2006 | Dravida | 455/562.1 |
| 2007/0173282 A1* | 7/2007 | Noda et al. | 455/550.1 |
| 2007/0243832 A1 | 10/2007 | Park et al. | |
| 2007/0264009 A1 | 11/2007 | Sabat, Jr. et al. | |
| 2007/0274279 A1 | 11/2007 | Wood et al. | |
| 2009/0232507 A1 | 9/2009 | Gupta et al. | |
| 2009/0239491 A1* | 9/2009 | Bargroff et al. | 455/234.1 |
| 2009/0291653 A1* | 11/2009 | Suzuki et al. | 455/127.2 |
| 2010/0172427 A1 | 7/2010 | Kleider et al. | |

FOREIGN PATENT DOCUMENTS

| | | |
|---|---|---|
| EP | 0709974 A1 | 5/1996 |
| EP | 0 938 204 A1 | 8/1999 |
| EP | 1 085 684 A2 | 3/2001 |
| GB | 2 313 020 A | 11/1997 |
| JP | 05252559 A | 9/1993 |
| JP | 05327569 A | 12/1993 |
| JP | 05327576 A | 12/1993 |
| WO | WO-9613102 A1 | 5/1996 |
| WO | WO-9804054 A1 | 1/1998 |
| WO | WO-02091618 A1 | 11/2002 |
| WO | WO-2004107783 A1 | 12/2004 |
| WO | WO 2006/105185 A2 | 10/2006 |
| WO | WO-2006136811 A1 | 12/2006 |
| WO | WO-2007133630 A2 | 11/2007 |

OTHER PUBLICATIONS

Written Opinion of the International Searching Authority for PCT/US2008/0002226 mailed Aug. 21, 2008, 6 pages.

International Search Report for PCT/US2008/000663 mailed Jun. 20, 2008, 4 pages.

Written Opinion of the International Searching Authority for PCT/US2008/000663 mailed Jun. 20, 2008, 5 pages.

International Search Report for PCT/US2008/000659 mailed Jul. 2, 2008, 6 pages.

Written Opinion of the International Searching Authority for PCT/US2008/000659 mailed Jul. 2, 2008, 7 pages.

Written Opinion of the International Searching Authority for PCT/US2008/0002225 mailed Aug. 27, 2009, 4 pages.

International Search Report dated Jul. 30, 2009.

Written Opinion of the International Searching Authority dated Jul. 30, 2009.

* cited by examiner

METHOD AND SYSTEM FOR EQUALIZING CABLE LOSSES IN A DISTRIBUTED ANTENNA SYSTEM

CROSS-REFERENCE TO RELATED APPLICATIONS

This application claims any and all benefits as provided by law of U.S. Provisional Application No. 60/885,470 filed Jan. 18, 2007, which are hereby incorporated by reference in their entirety.

STATEMENT REGARDING FEDERALLY SPONSORED RESEARCH

Not Applicable

REFERENCE TO MICROFICHE APPENDIX

Not Applicable

BACKGROUND

1. Technical Field of the Invention

The present invention is directed to Distributed Antenna Systems and more particularly, to methods and systems for compensating for signal loss or attenuation in order to provide predictable signal strength at the uplink and downlink endpoints.

Figure 1:
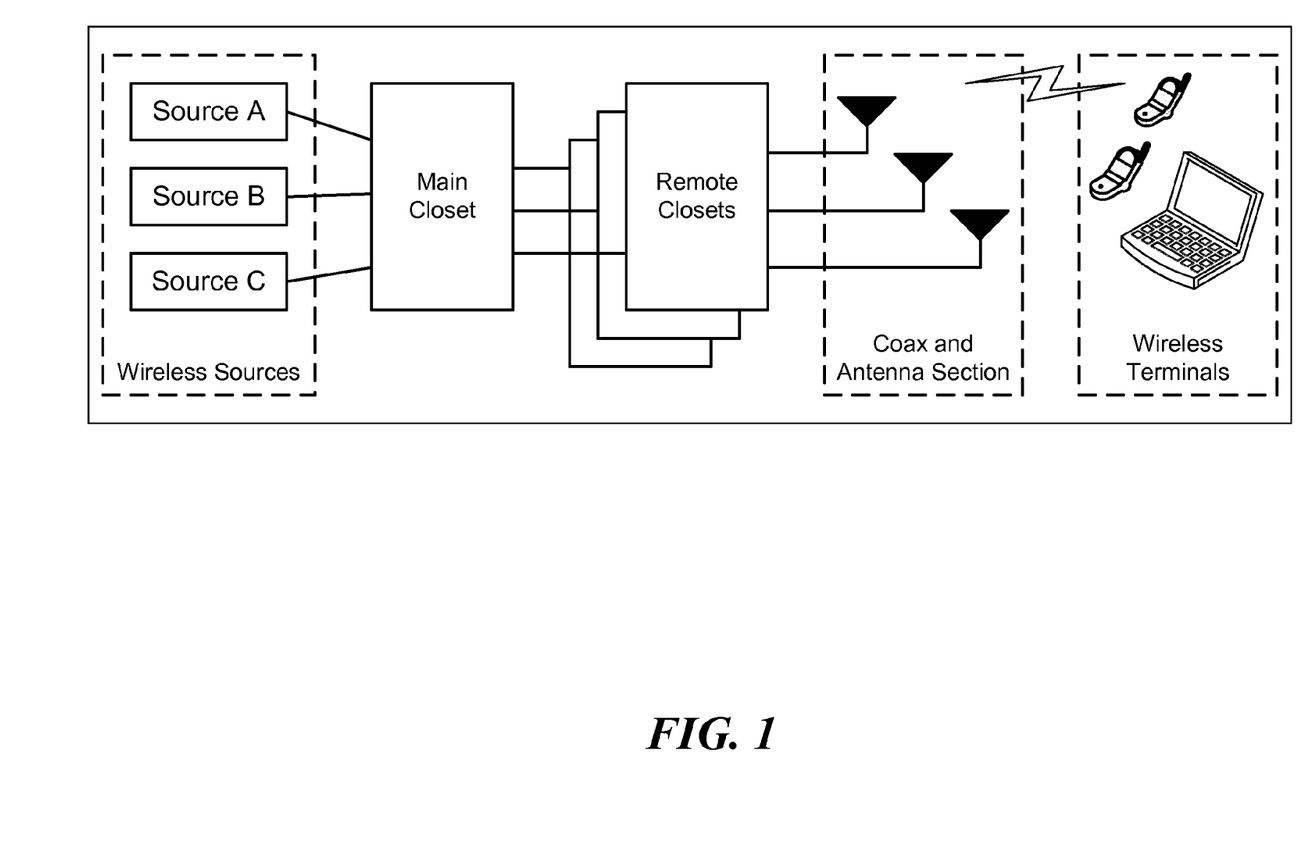
FIG. 1 is a block diagram of a DAS.

Distributed Antenna Systems ("DAS") are used to provide or enhance coverage for wireless services such as Cellular Telephony, Wireless LAN and Medical Telemetry inside buildings and over campuses. The general architecture of a DAS is depicted in FIG. 1.

Figure 2:
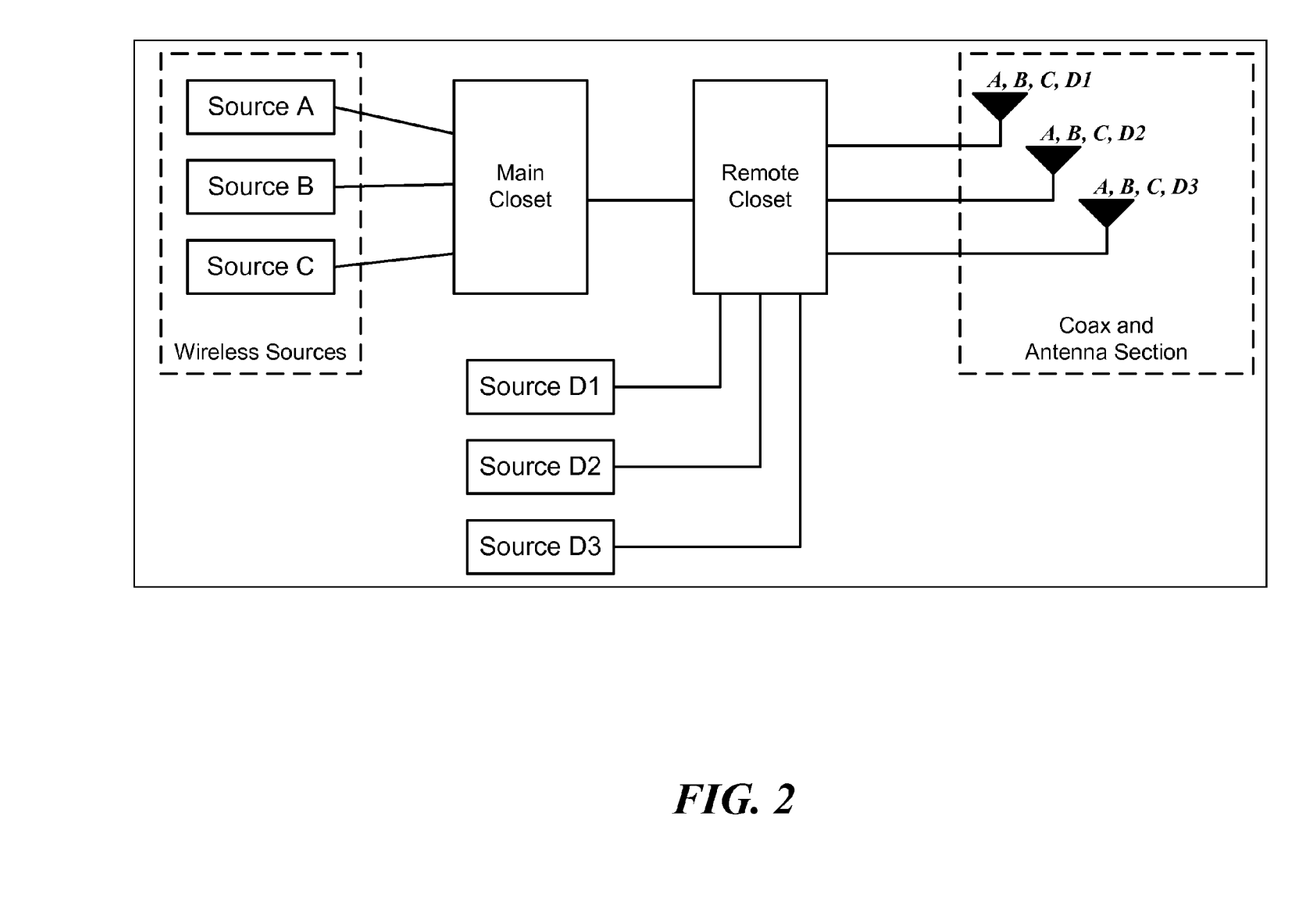
FIG. 2 is a block diagram of a DAS.

A single DAS can serve a single wireless service or a combination of wireless services operating over multiple bands. With respect to each wireless service served by the DAS, the Aggregation Configuration of the wireless service can be characterized as non-aggregated or aggregated. In a non-aggregated configuration, there is a 1:1 relationship between DAS antennae and Transmitter/Receiver units for that wireless service. In an aggregated configuration, each Transmitter/Receiver unit for a given wireless service is associated with multiple DAS antennae through a hierarchy of aggregation. For example, in FIG. 2, Services A, B, and C are aggregated and Services D1, D2, and D3 are non-aggregated. Typically, wireless LAN services are arranged in a non-aggregated configuration when using a DAS while cellular services are typically arranged in an aggregated configuration.

One desired characteristic of a multi-service DAS is that it can use a single antenna to radiate and receive the signals for all services and frequency bands supported by the DAS. Such an antenna would need to cover (i.e. have acceptable performance) in all frequency bands of interest and is commonly referred to as a Broadband Antenna. An example of a supported frequency range for a DAS antenna would be 400 MHz-6 GHz.

In referring to the signal flows in DAS systems, the term Downlink signal refers to the signal being transmitted by the source transmitter (e.g. cellular base station) through an antenna to the terminals and the term Uplink signal refers to the signals being transmitted by the terminals which are received by an antenna and flow to the source receiver. Many wireless services have both an uplink and a downlink, but some have only a downlink (e.g. a mobile video broadcast service) or only an uplink (e.g. certain types of medical telemetry).

2. Description of the Prior Art

Different DAS may use different types of cabling to connect the antennae units to the wiring closet: various kinds of coaxial cable, CAT-5/6, optical fiber, etc. Analog signals can become attenuated as they propagate along the cable—the magnitude of attenuation depends on the characteristics of the cable, and is generally proportional to the length of the cable and to the frequency of the signal.

Multi-service DAS usually use passive (i.e. un-powered) broadband antennae located, for example, in the ceilings, throughout a facility, connected with broadband coax cabling to active components residing in wiring closets. This is because passive antennae are cheaper and more reliable than powered antennae and the introduction of power amplifiers in the antenna can introduce interference between bands that requires the use of bulky and expensive filters to mitigate.

SUMMARY

A common problem of virtually any DAS installation is that the cables connecting the different antennae to the wiring closet are not of equal lengths. The cable lengths may range from as little as 30' to as much as 300' or more. It follows that the power level at which a signal would be transmitted from an antenna connected through a "short" cable could be significantly higher than that transmitted from an antenna connected through a "long" cable. For example, assuming certain types of coaxial cables, the difference in propagation loss between a 30' cable and a 300' for a signal at 6 GHz would be more than 20 dB, and therefore a downlink signal launched with equal power at the wiring closet into the two antenna cable runs would yield a dramatically different power level at each and resulting in a corresponding disparity in coverage radius around each antenna.

One of the problems created by the disparity in antenna cable lengths is the varying coverage radius. As a result of different attenuation for both uplink and downlink, the effective coverage radius of each antenna may vary widely depending on the length of its cable run. This variance can complicate the antenna location planning process and would typically increase the cost of the project. For signals using the non-aggregated configuration, where each antenna is radiating a different signal, the variation in coverage radius can complicate (automatic) frequency channel assignment processes and may introduce interference.

Another problem created by the disparity in antenna cable lengths is narrowing of system uplink dynamic range in systems in aggregated configurations. One measure of the uplink performance of a system is its Dynamic Range. Simply defined, Dynamic Range is the range of power levels, lowest to highest, that the system can handle simultaneously. In a system composed of a well-designed DAS and a receiver, the receiver would typically have the more restricted dynamic range.

A more restricted dynamic range can impact the design and deployment as well as the cost of the DAS. Generally, the strongest uplink signal is created when the terminal is as close as would be physically allowed to one of the DAS antennas (since in this case the propagation loss in the air is the smallest possible) and the weakest uplink signal is created when the terminal is as far away as is physically allowed from its nearest DAS antenna. The difference between the strongest signal and the weakest signal as described above must not exceed the dynamic range of the system. Since there is no way to limit the strongest signal coming into the system, the only available way is to ensure the weakest signal is not too weak. The way to ensure that is to decrease the distance between antennas, thus shrinking the maximal distance between a terminal and its nearest antenna. This in turn has a negative financial impact as more antennas may be required for a given coverage area. The disparity in antenna cable run length further exacerbates the problem, since the system design now needs to take into account the case where the weakest signal is received through an antenna with a long cable run while the strong signal is received through an antenna with a short cable run. The end result would be a further decrease in antenna spacing and increased project costs.

It should be noted that in a DAS handling multiple wireless services at different frequencies, the disparity in propagation losses on the cable will vary by frequency band (i.e. be larger for high frequencies).

All of the above problems can be alleviated by equalizing the signal losses associated with each antenna cable run, such that similar losses are experienced on every run. If the loss on each cable is known, attenuators and/or amplifiers can be used to compensate for high or low loss, ultimately equalizing the losses. This can be achieved by a manual process of measuring the length of each cable or directly the loss on it and installing attenuators or amplifiers in-line to the signal path on each cable run. However, a manual process is cumbersome, error-prone and would significantly increase the labor costs of the project. It does not solve the above identified problems for a DAS handling multiple signals at different frequencies, each requiring a different level of attenuation and/or amplification.

In the case that amplification functionality is integrated into the antenna for one or more bands, a possible solution would be to include an Automatic Gain Control (AGC) mechanism that would ensure the downlink signal is radiated at a pre-set power from the antenna regardless of the losses in incurs in the cable run. However, this does not address the equalization required for the uplink, and therefore does not resolve the impact on uplink dynamic range. In addition, in some configurations, for example, non-aggregated configuration services such as Wi-Fi, the transmitter/receiver (e.g. Wi-Fi access point) must be permitted to dynamically control the coverage radius around the associated antenna by increasing or decreasing the downlink transmit power. If the DAS has constant power gain, power changes by the transmitter external to the DAS will be reflected in the coverage radius around the corresponding DAS antenna, as required. However, if a downlink AGC mechanism is implemented in the antenna, any power changes in the transmitter power would be compensated by the AGC and the intended result of dynamically changing coverage radius would not be achieved.

In addition, wireless services (e.g. Wi-Fi) are being introduced in increasingly higher frequency bands (e.g. WLAN at 2.4 GHz and especially 5.5 GHz). This creates challenges when using passive antennae because analog signals are attenuated as they propagate along the coax cable and the magnitude of attenuation depends on the characteristics of the cable, and is generally proportional to the length of the cable and to the frequency of the signal. For in-building DAS deployments, cable lengths can reach 300' or more, and the attenuation experienced by high frequency signals along such a length of cable will significantly degrade the downlink power of the signal as it reaches the antenna (the uplink signal would be subject to a similar problem). The result is a substantially reduced coverage radius for that frequency band around the antenna and the associated increased cost to add more antennae.

Introducing amplification in the antenna can compensate for the losses in the cable, for both the uplink and downlink signals, and thus alleviate the problem. For example, some single-service DAS platforms use single-band (a.k.a. narrowband) antennae which are active, in other words have integrated amplifiers for the specific band being addressed. Further, a multi-service DAS which requires some bands to be amplified to overcome cable losses can be implemented using a collection of separate and discrete narrowband antennae. However, this has significant commercial disadvantages in terms of cost, performance and aesthetics.

One object of the invention is to provide a DAS which includes a system for compensating for cable losses which provides for predictable coverage radii regardless of cable lengths and frequency, and preserves the transparency to transmitter power variations.

Another object of the invention is to provide a DAS which includes a system for automatically compensating for cable losses regardless of cable lengths and frequency, and preserves the transparency to transmitter power variations.

Another object of the invention is to provide a DAS which includes a system for automatically compensating for cable losses which provides for predictable coverage radii regardless of cable lengths and frequency, and preserves the transparency to transmitter power variations.

Another object of the invention is to provide a DAS which includes a system for automatically compensating for cable losses in both aggregated and non-aggregated configurations regardless of cable lengths and frequency, and preserves the transparency to transmitter power variations.

In accordance with the invention, system can include a loss measurement component and an equalization component. One or more RF measurement signals can be generated at one end of the cable run, for example, the end coupled to the antenna and used to estimate signal loss over the cable run. The loss measurement component can be connected at the other end of the cable run, for example, in the wiring closet where the cable run begins and be adapted to receive one or more of the RF measurement signals and determine or estimate the cable losses for one or more of the RF signals, signal frequencies or signal channels based on one or more of the RF measurement signals received. Alternatively, one or more RF measurement signals can be generated at the end of the cable run adjacent the wiring closet and received by the loss measurement component at the end of the cable run adjacent the antenna unit. The equalization component can be located at either end of the cable run and connected to the loss measurement component whereby the estimated cable losses can be used to equalize the losses of one or more cable runs to a predetermined value or to adjust the signal amplitude input to the antenna to be a predetermined value.

In accordance with the invention, the method can include providing a measurement signal generator, providing a loss measurement component and providing an equalization component. Generating one or more RF measurement signals used to estimate signal loss over the cable run by the measurement signal generator located adjacent the end of the cable run coupled to the antenna. Receiving one or more of the RF measurement signals by the loss measurement component at the other end of the cable run, for example in the wiring closet where the cable run begins and determining or estimating cable losses for one or more RF signals, signal frequencies or signal channels based on one or more of the RF measurement signals received. Equalizing or adjusting the losses of one or more cable runs to a predetermined value or the signal amplitude input to the antenna to be a predetermined value as a function of the estimated or determined cable losses.

In accordance with an embodiment of the invention, a distributed antenna system that supports a plurality of frequency band or channel connections can include a hybrid passive active antenna unit. The hybrid passive active antenna unit can include a main frequency multiplexer connected to a plurality of respective antenna elements which are used to transmit and receive signals over the corresponding respective frequency band. Each frequency band connection can include a single band amplification block or a multi-band amplification block, depending on whether only a single frequency band corresponding to an antenna section needs to be amplified or a whether multiple bands corresponding to common antenna section need to amplified. Each single band amplification block can include an uplink and downlink duplexer connected to a main frequency multiplexer for separating and combining the uplink and downlink frequency bands and for feeding the uplink and downlink frequency bands into and receiving the uplink and downlink frequency band from their corresponding amplifiers according to the appropriate direction of the signal flow. Each multi-band amplification block can include frequency multiplexer blocks which are adapted to separate out the frequency bands that need to be amplified, feeding them into a single band amplification block for amplification and for combining them back into the frequency band connection.

The present invention can be applied to single service and multi-service DAS, in both aggregated and non-aggregated configurations and to both downlink and uplink signal flows.

These and other capabilities of the invention, along with the invention itself, will be more fully understood after a review of the following figures, detailed description, and claims.

DETAILED DESCRIPTION OF PREFERRED EMBODIMENTS

The present invention is directed to a method and system for compensating for cable losses in distributed antenna systems. In accordance with one embodiment of the invention, the system includes a measurement component adapted to receive a measurement signal having a known frequency and power level and for determining or estimating the losses of a signal transmitted at one end of the cable run and received at the other end of the cable run. In accordance with the invention, the system further includes an equalization component adapted for receiving the information about the determined or estimated cable run losses and for adjusting the signal level to a predetermined value. Each cable run in the DAS can include the system according to the invention whereby the signal levels of each cable run can be adjusted to the predetermined value. In one embodiment, the signal level corresponding a particular service or frequency range or band at the connection to the antenna unit can adjusted to the same level for all antenna units.

In accordance with one embodiment of the invention, one or more measurement components can be located at the beginning of one or more cable runs, for example, in the wiring closet at the opposite end of the cable run from the end connected to the antenna elements. RF measurement signals can be received by the antenna elements from an RF measurement signal transmitter or input to the cable at the antenna end of the cable by a signal generator and communicated to the measurement component over each of the cable runs to be equalized. An equalization component can be located at the beginning of one or more cable runs and be controlled by an associated measurement component to adjust the signal loss over the one or more cable runs to a predetermined value. Alternatively, the measurement component and the equalization component can be located at the end of the cable run connected to the antenna and the RF measurement signals can be generated and transmitted from the beginning of one or more cable runs, for example, from the wiring closet.

In accordance with the invention, the DAS can provide a single wireless service or multiple wireless services. With respect to systems providing multiple wireless services, the invention can provide individualized equalization for all or any subset of the frequency bands over which services are provided. The invention can be incorporated in DAS where the antenna unit does not include any amplification capability for any frequency band as well as to DAS in which the antenna unit includes amplification capability for one or more frequency bands. The invention can use software in its implementation and the method according to the invention can be software controlled and completely automated.

In accordance with another embodiment of the invention, the system can include a measurement component and an equalization component.

The measurement component can be adapted to measure the signal loss on the Cable Run. The Antenna Unit or a component coupled to the cable run at the end connected to the Antenna Unit, can generate a signal at a known frequency and known power level and transmit that signal over the uplink of the Cable Run, and having a component of the Wiring Closet Unit for that antenna measure characteristics of the received signal at the wiring closet, such as the power level. The difference between the known transmit power and the received power level would indicate the loss on the Cable Run for that frequency. A separate measurement can be done for any frequency of interest by generating a signal in that frequency and measuring the received power. Alternatively, a measurement at one frequency can be made and the result in combination with the known loss characteristics of the cable at different frequencies can be used to estimate the losses at other frequencies.

Equalization component can be adapted to achieve the equalization of losses on one or more cable runs by adjusting the loss on the cable run to a pre-determined value in all cable runs that are to be adjusted. This can be implemented by incorporating a gain adjustment block for each frequency of interest at one end of each cable run, for example, in the Wiring Closet Unit. Based on the measurement of signal loss on each cable run, the correct gain setting can be applied to the gain adjustment block such that the overall signal level at a particular location along the cable run will match the predetermined value. The gain adjustment block can be implemented using a Digitally Controlled Attenuator (DCA), potentially in combination with an amplifier. Separate gain adjustment blocks can be provided for uplink and downlink of each frequency of interest. In some applications, only the downlink or only the uplink loss adjustment can be provided.

Figure 3:
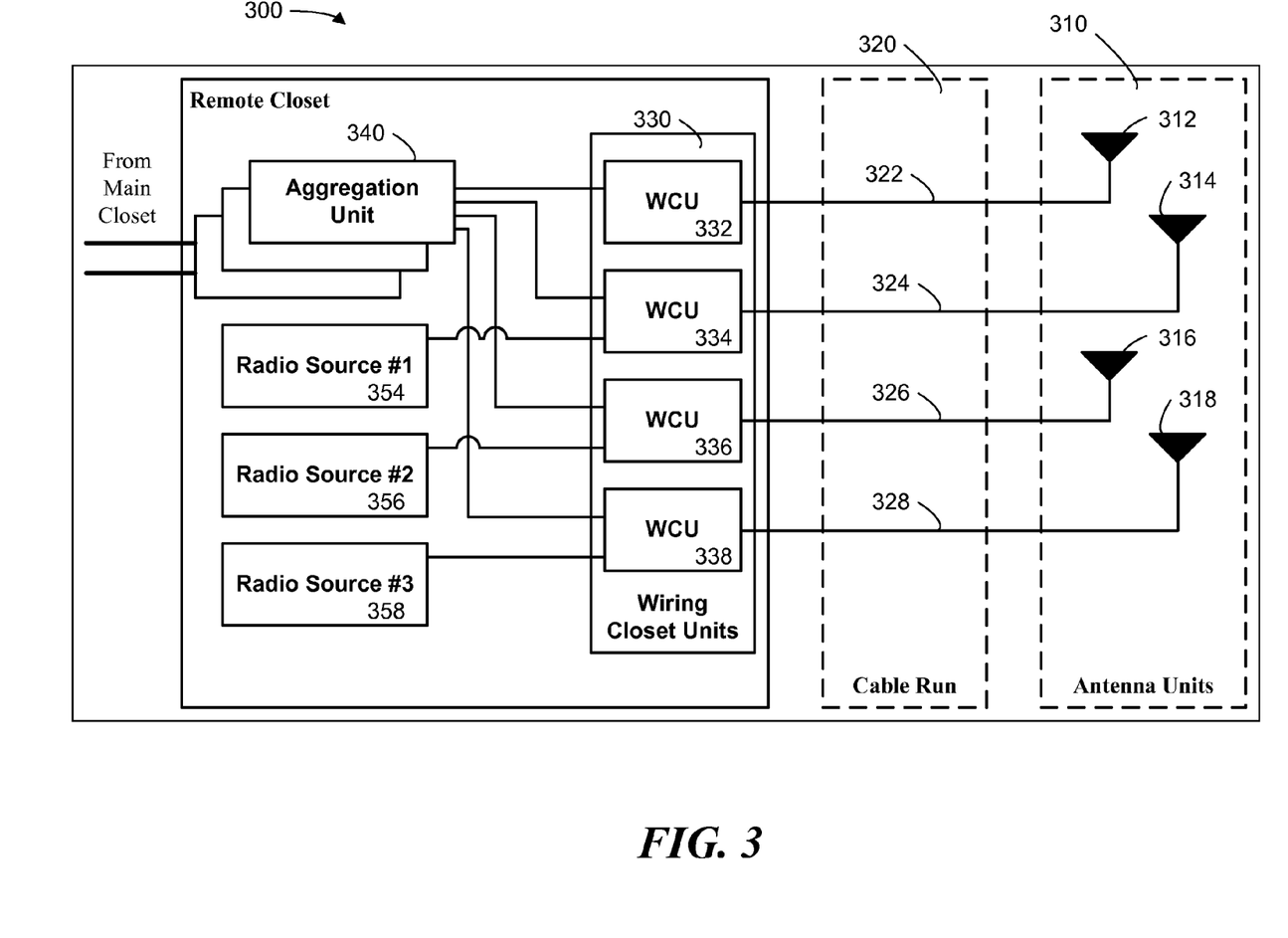
FIG. 3 is a block diagram of a DAS according to the invention.

As shown in FIG. 3, the system 300 according to the invention can include one or more antenna units 310, 312, 314, 316, 318 and one or more wiring closet units (WCUs) 330, 332, 334, 336, 338 connected by a cable run 320, 322, 324, 326, 328. The Antenna Unit 310, 312, 314, 316, 318 can include the antenna component or components that provide various functions as described herein. Antenna Units 310, 312, 314, 316, 318 can be deployed in the ceiling of a building and connected by Cable Run(s) 320, 322, 324, 326, 328 to the Wiring Closet Unit(s) 330, 332, 334, 336, 338. The Wiring Closet Units 330, 332, 334, 336, 338 can be a component residing in the wiring closet and terminating the Cable Run 320, 322, 324, 326, 328 to/from an Antenna Units 310, 312, 314, 316, 318. In one embodiment, multiple Wiring Closet units 330, 332, 334, 336, 338 can be integrated into a single physical enclosure. The Cable Runs 320, 322, 324, 326, 328 include the stretch of cable connecting an Antenna Unit 310, 312, 314, 316, 318 to its associated Wiring Closet Unit 330, 332, 334, 336, 338. One or more aggregation units can be used to provide services that utilize an aggregated configuration and Radio Source #1 354, Radio Source #2 356, Radio Source #3 358, can be used to provide services that utilize a non-aggregated configuration.

Figure 4:
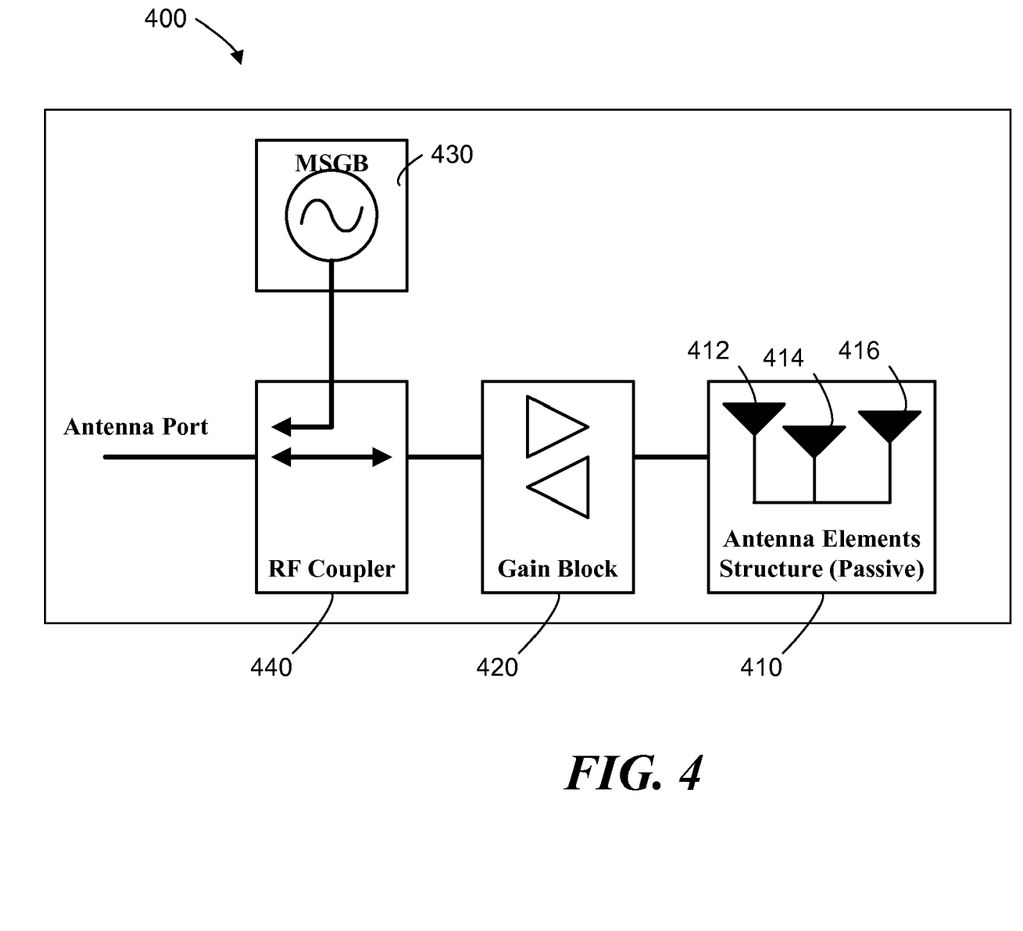
FIG. 4 is a block diagram of an antenna unit of a DAS according to the invention.

In accordance with one embodiment of the invention, the Antenna Unit 400, as shown in FIG. 4, can have several functional blocks or components, including one or more antenna elements 410, 412, 414, 416, an active gain block 420, a measurement signal generation block 430 and an RF coupler 440. The antenna elements 410 can include one or more passive elements 412, 414, 416 that provide gain in one or more frequency bands. The antenna elements 412, 414, 416 can support different polarizations and directivity.

The Active Gain Block 420 can provide amplification for one or more frequency bands, either in one-directional or bi-directionally as provided in more detail herein. The Active Gain Block 420 can be omitted.

The Measurement Signal Generation Block (MSGB) 430 can be provided for generating the RF measurement signal used for loss estimation and adjustment.

An RF coupler 440 can be used to inject the RF measurement signal coming from the MSGB 430 into the main RF path of cable run. The RF coupler 440 could be placed at many different points in the signal chain in order to determine the signal losses between any two or more points along the signal chain.

The power required at the antenna unit 400 to generate the measurement signal or tone can be supplied in one or more of the following ways: 1) by incorporating a battery in the Antenna Unit 400, 2) by providing a power feed to the Antenna Unit 400 separate from the Cable Run, or 3) by providing DC powering over the Cable Run. If there are other active elements in the Antenna Unit (e.g. amplifiers), a single power feed can be used for all active elements.

The MSGB 430 can be a component which constantly generates a Constant Wavelength (CW) measurement signal at a preset frequency. This basic functionality can be augmented or modified in any of the following ways or a combination of them:

Alternatively, instead of a constant transmission of the measurement signal, the transmission can be periodic or triggered by an external trigger, such as a Manual switch on the antenna unit, turning on/off the power supply to the unit, receiving a trigger signal generated by the Wiring Closet Unit (WCU) 330 across the Cable Run 320 at a frequency monitored by the Antenna Unit 400. Alternatively, the signal could operate for a preset time every time power is applied to the antenna unit.

Alternatively, the MSGB 430 can generate tones or signals in multiple frequencies, either concurrently or in series. If in series, the Antenna Unit 400 can cycle periodically through a pre-set sequence or series of frequency bands or be driven by an external trigger as described above.

To the extent there are active elements in the Antenna Unit 400 other than the MSGB 430, the Measurement Signal can be used to indicate to the Wiring Closet Unit 330 the presence and health of the circuitry in the Antenna Unit 400. In one embodiment, the Antenna Unit 400 can determine status information, such as determine a binary OK/Not-OK status for the Antenna Unit 400 and communicate that status using the Measurement Signal (for example, by turning off the signal transmission if the status is Not-OK and vice-versa). This function can be used to provide for remote monitoring of the health of the Antenna Unit 400.

Rather than using a CW measurement signal, a modulated signal can be used. The modulation scheme can be selected such that it would not impede the ability to accurately measure the power level of the signal. The modulated signal can carry other information or information of an arbitrary nature.

Figure 5:
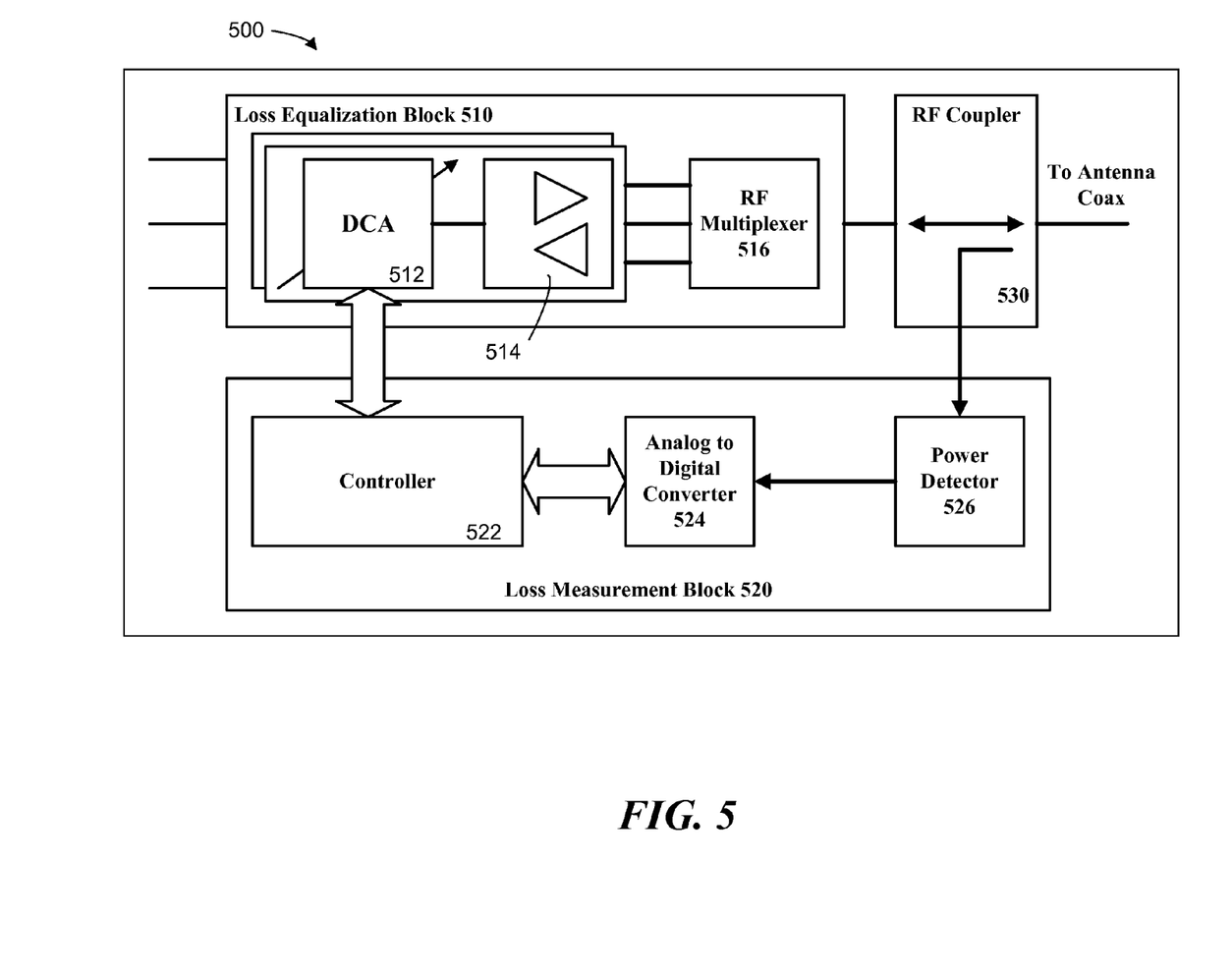
FIG. 5 is a block diagram of a loss estimation block and an equalization block according to the invention.

In accordance with one embodiment of the invention, the Wiring Closet Unit (WCU) 500, as shown in FIG. 5, can include a Loss Measurement Block 520, a Loss Equalization Block 510 and an RF Coupler 530. The Wiring Closet Unit 500 can also include additional functionality that is not relevant to the invention.

Loss Measurement Block 520 can measure the received power of the measurement signal(s) generated from the Antenna Unit 400. A software function can be provided which can use one or more of these measurements and other information to estimate the loss incurred by signals in different frequencies as they traverse the Cable Run. The Loss Measurement Block 520 can be adapted to cooperate with and support the functions of the MSGB 430 in the Antenna Unit 400, such as providing support for the triggering function and providing modulation and antenna health monitoring capabilities. The Loss Measurement Block 520 can include a power detection function 526 and a Analog-to-Digital converter function 524 that can interface the power measurement information to the software-driven controller 522. In addition, a filtering function can be provided to ensure that the power measured by the detector 526 is at the frequency of the signal generated by the antenna unit 400.

Loss Equalization Block 510 can include gain adjustment components and functionality (e.g. amplifiers 514, digitally controlled attenuators 512) for the downlink and/or uplink of one or more frequency bands. The Loss Equalization Block 510 can also include a component or functionality to multiplex and/or de-multiplex 516 different frequency bands as may be necessary.

An RF coupler 530 can allow the Loss Estimation Block 520 to access the measurement signal generated by the Antenna Unit 400 and the Loss Equalization Block 510 to access the "payload" signals. The RF coupler 530 can be introduced at different places in the signal chain, depending on details of the implementation.

In an alternative embodiment, one or more measurement signals can be applied to the cable run from the wiring closet end and a measurement component can be provided at the antenna end of the cable run to measure the downlink cable losses. An equalization component can be provided at either the wiring closet end or the antenna end in order to adjust and equalize the cable losses to a predetermined value for the downlink. Using the equalization component, the signal level at any point in the cable run, (e.g. at the antenna end or the WCU end) can be adjusted to a predefined value.

In accordance with the method of the invention, an antenna unit and a wiring closet unit can be provided. One or more measurement signals can be applied to the antenna end of the cable run, either by an RF connector connected at that location or by a signal generator transmitting a measurement signal to the antenna. The wiring closet unit can receive one or more of the measurement signals at the wiring closet end of the cable run and determine the losses at one or more frequencies as a function of the measured signal losses of one or more of the measurement signals. Based on one or more of the measured signal losses, the level of the signal transmitted over the cable run can be adjusted to a predetermined value. A loss estimation block can be provided to measure the signal levels, estimate losses and input the signal losses into a controller. The controller can control a digital controlled attenuator to adjust the cable run signal levels to a predefined value. The digital controlled attenuator or similar amplifier/attenuator can amplify or attenuate the signal in order to adjust for the cable run losses and adjust the signal level to a predefined value.

Figure 6:
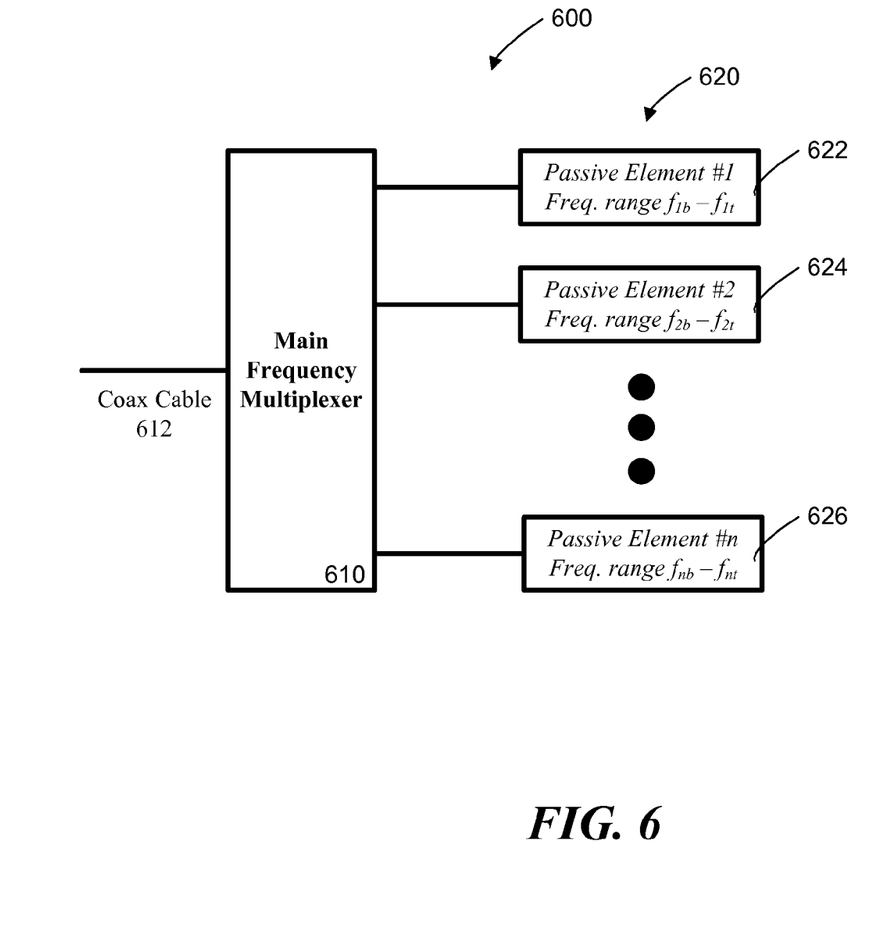
FIG. 6 is a block diagram of a hybrid passive active antenna according to the invention.

FIG. 6 shows the general architecture of a broadband passive antenna 600 according to the invention. The antenna unit 600 receives broadband DL signals from the wiring closet and sends broadband UL signals to the wiring closet over a coaxial cable 612. The main frequency multiplexer 610 separates the frequency bands for the DL signal to connect them to the appropriate antenna element 622, 624, 626 for each frequency band or range. The main frequency multiplexer 610 also combines the frequency bands of the UL signals from each of the antenna elements 622, 624, 626 to be sent to the wiring closet over the coaxial cable 612.

For purposes of description, a section of the antenna refers to the element or elements 620, 622, 624, 626 of the antenna responsible for handling a specific frequency range or band (or set of bands) and having a single connection to the main frequency multiplexer 610. An antenna can have one or more sections. If the antenna has a single section, a main frequency multiplexer may not be needed. Each section 620, 622, 624, 626 of the antenna can handle one or more frequency bands (within the respective frequency range) which are of interest in the context of the services supported by the DAS.

The Main Frequency Multiplexer 610 couples (combines) all UL signals from each different section onto a single connection to the coax cable 612. The combined DL signal coming from the coax cable 612 are separated by the Main Frequency Multiplexer 610 according to frequency range or band, with each frequency range or band being connected to its respective section and the elements 622, 624, 626 that correspond to the frequency range or band.

According to the present invention, a hybrid passive-active broadband antenna can provide amplification for certain frequency bands while the other bands continue to be handled passively. The need for amplification can be determined by evaluating the frequency bands and antenna configurations used to provide wireless services as described herein. Preferably, the signals that become attenuated the most over long cable runs, such as the higher frequency bands) can be amplified in the antenna unit. The frequency bands to be amplified (or attenuated) and amount of gain (or attenuation) applied to the frequency band or range, can be chose to suit the application.

Figure 7:
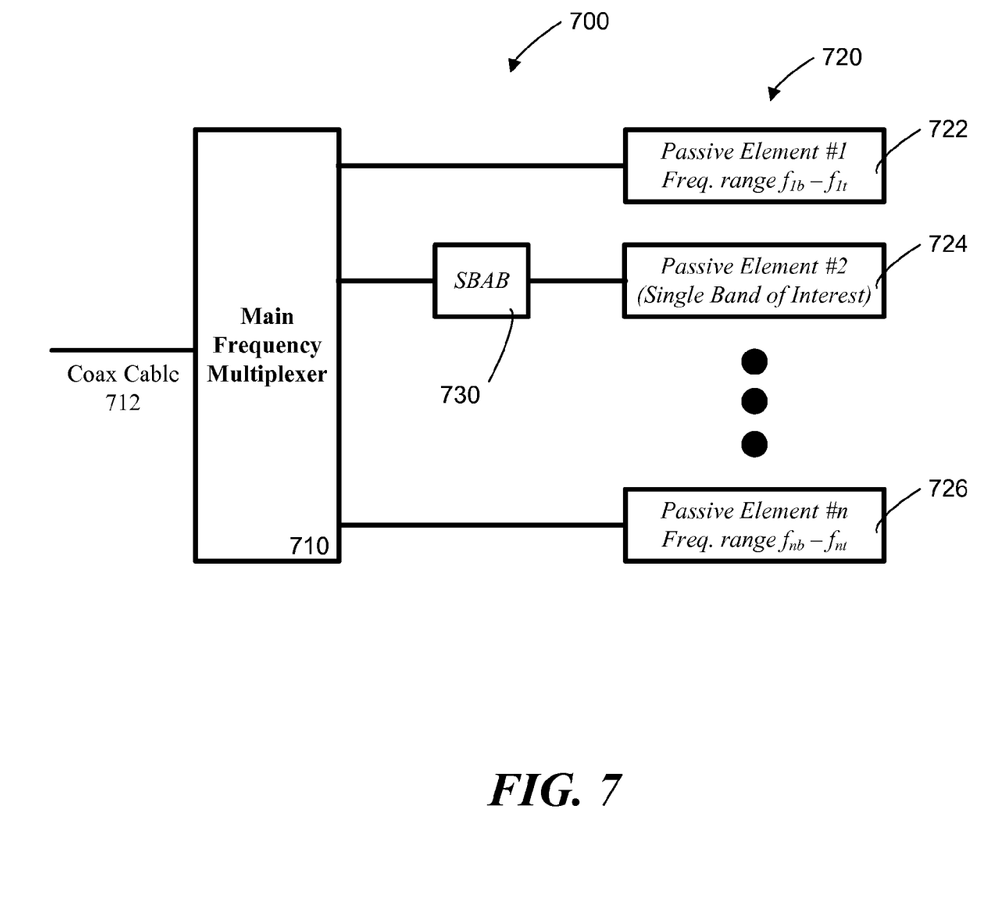
FIG. 7 is a block diagram of a hybrid passive active antenna according to the invention.

Similar to FIG. 6, FIG. 7 shows a hybrid passive-active broadband antenna 700 where the frequency band to be amplified is the only band of interest in its section 724 of the antenna. A Single Band Amplification Block (SBAB, described below) 730 can be provided on the section's connection to the main frequency multiplexer 710.

Figure 8:
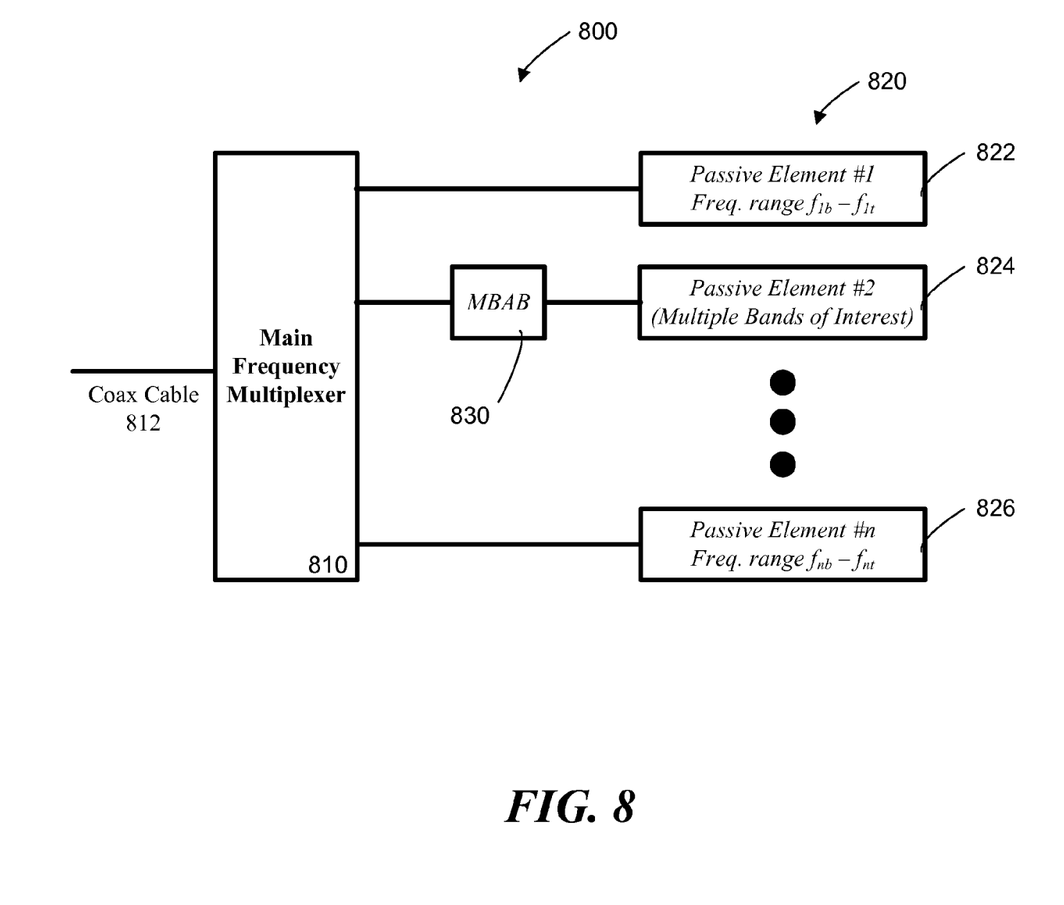
FIG. 8 is a block diagram of a hybrid passive active antenna according to the invention.

Similar to FIGS. 6 and 7, FIG. 8 shows a hybrid passive-active broadband antenna 800 where there are multiple bands of interest in a section 824, one or more of which need to be amplified, a Multiband Amplification Block (MBAB) 830 can be provided on the section's connection to the main frequency multiplexer 810, as shown in FIG. 8.

For each section of the antenna, depending on the level of amplification needed and the bands of interest handled by that section, either an SBAB 1000, an MBAB 900 or neither can be used. The high level architecture of a possible implementation for an MBAB 900 is shown in FIG. 9.

Figure 9:
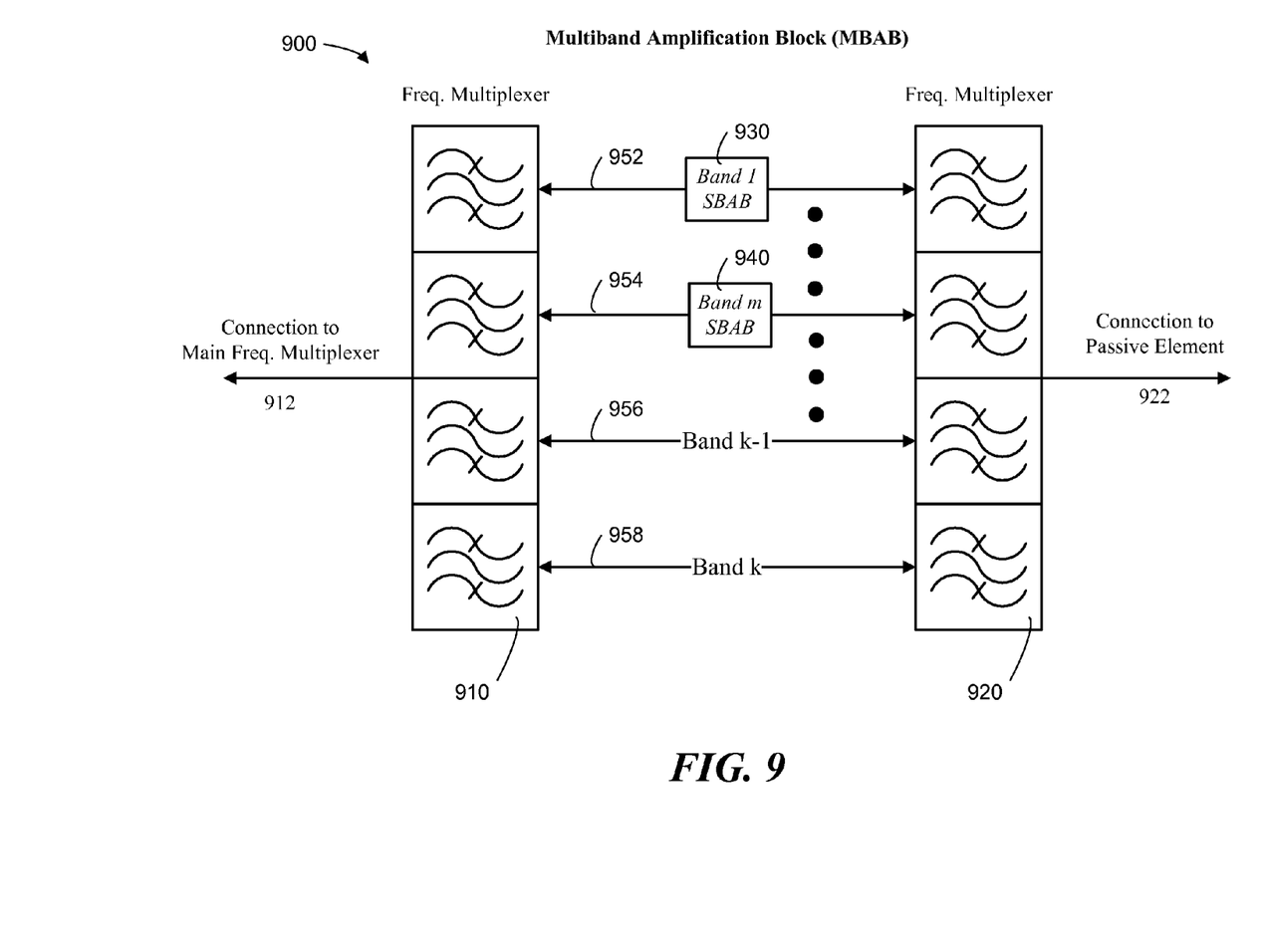
FIG. 9 is a block diagram of a multiband amplification block for a hybrid passive active antenna according to the invention.
Figure 10:
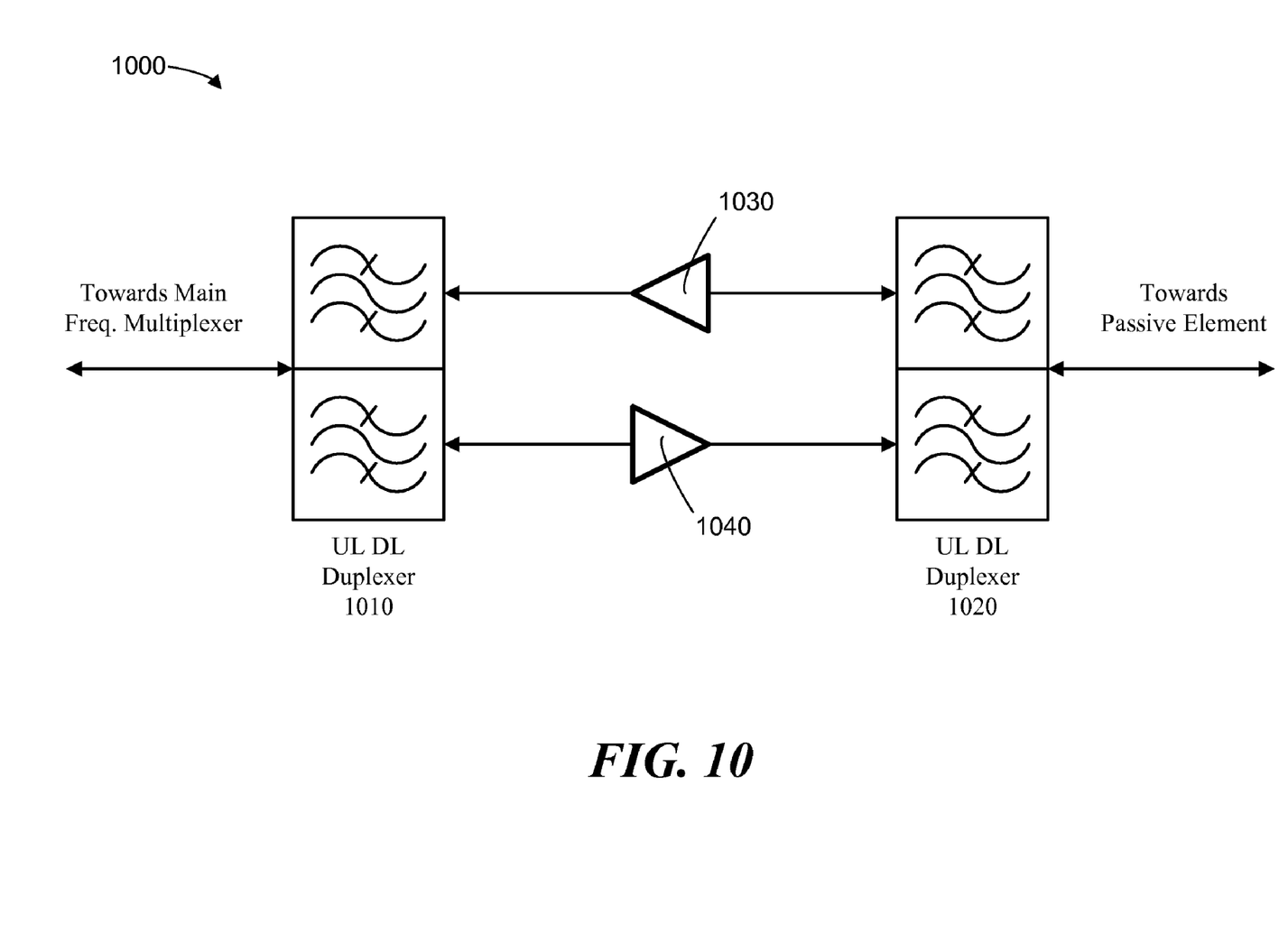
FIG. 10 is a block diagram of a Single Band Amplification Block for a hybrid passive active antenna according to the invention.

FIG. 9 shows a Multiband Amplification Block (MBAB) 900. The frequency multiplexer blocks 910, 920 can be adapted to separate and combine the frequency bands of interest and to separate and combine the subset of those frequency ranges or bands that need amplification. In particular, the block 910. 920 can split the combined signals into separate signal paths 952, 954, 956, 958 by frequency band such that at least all the bands 952, 954 that need amplification 930, 940 each have a separate signal path. Such frequency multiplexers can be designed with discrete components, such as capacitors and inductors, or using other techniques like integrating off the shelf ceramic filters or duplexers with a discrete design or using techniques based on printed circuit boards.

The functionality of the SBAB 1000 can be adapted to accommodate the wireless service operating in the corresponding band and the duplexing characteristic used. For Frequency Division Duplexing (FDD), separate frequency bands are used for uplink and downlink. For example, most cellular services operate in this mode. For Time Division Duplexing (TDD), the same frequency band is used for the uplink and the downlink, whereby at any given point in time, either the uplink or the downlink is operating but not both. For example, WLAN is a service that uses TDD. For a Downlink only service, data flows only from the source to the terminal, such as a video broadcast service. For an Uplink only service, data flows only from the terminal to a host, such as in certain variants of medical telemetry.

FIG. 10 shows Single Band Amplification Block (SBAB) 1000 for use with FDD services. A duplexer 1010, 1020 can be used to separate/combine the Uplink (UL) and Downlink (DL) frequency bands so that each can be amplified by US amplifier 1030 and DL amplifier 1040, separately in the appropriate direction. For the DL, the duplexer 1010, that is connected to the main frequency multiplexer, separates the DL signal so that it can be amplified by the amplifier 1040 and the duplexer 1020, that is connected to the antenna section, combines the DL signal back onto the connection to be transmitted by the antenna. For the UL, the duplexer 1020, that is connected to the antenna section, separates the UL signal so that it can be amplified by the amplifier 1030 and the duplexer 1010, that is connected to the main frequency multiplexer, combines the UL signal back onto the connection to be transmitted to the wiring closet and back to the receiver. Note that in the configuration where this SBAB is part of an MBAB, the functionality of the duplexers 1010, 1020 can be integrated with that of the frequency multiplexers in the MBAB. Where a service is an uplink only or downlink only service, only an amplifier is needed and no duplexers would be needed.

Figure 11:
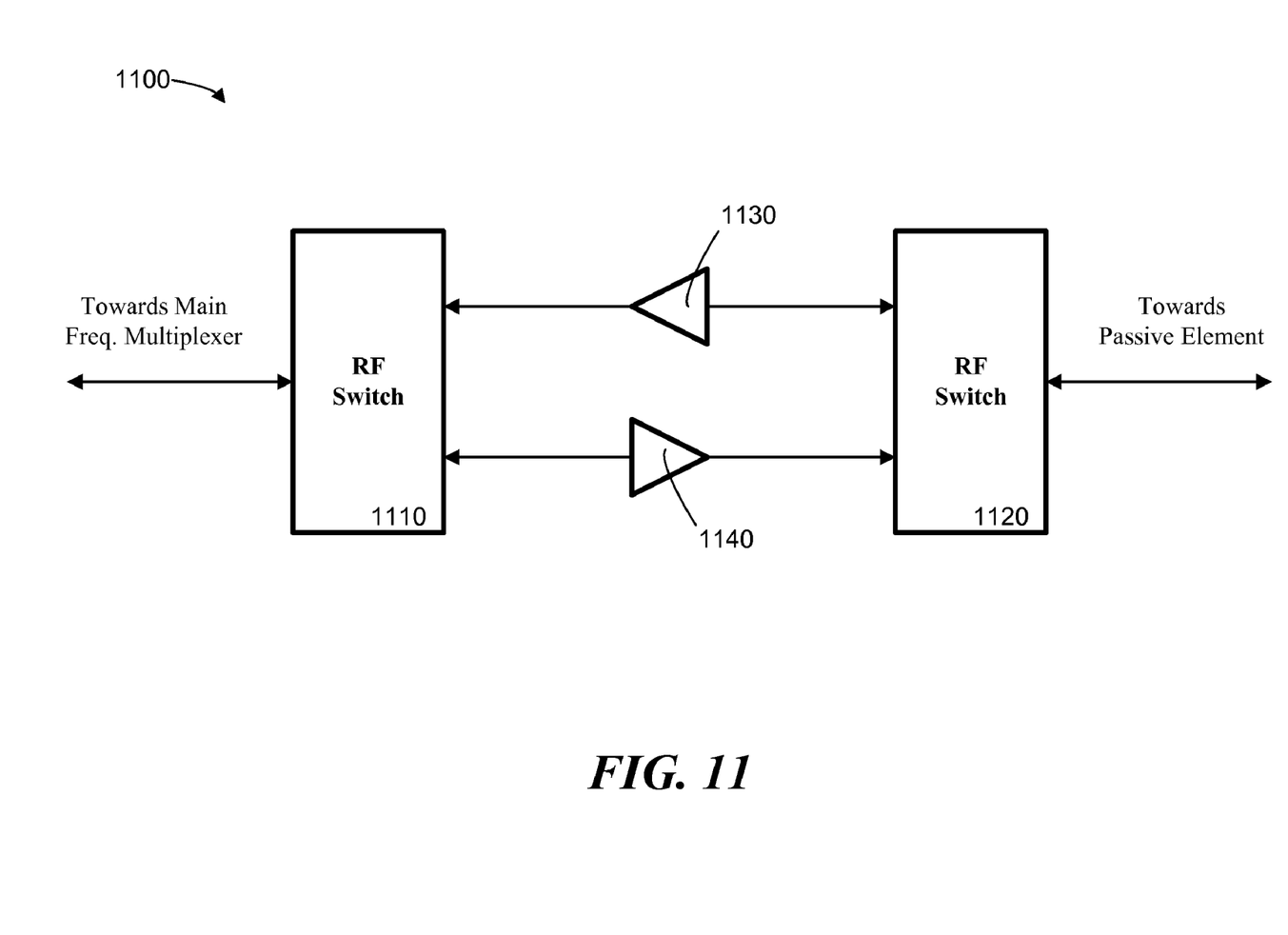
FIG. 11 is a block diagram of a Single Band Amplification Block for a hybrid passive active antenna according to the invention.

FIG. 11 shows Single Band Amplification Block (SBAB) 1100 for use with TDD services. The RF Switches 1110, 1120 support the single-direction-at-a-time nature of the TDD communications, by allowing only UL (through amplification block 1130) or only DL (through amplification block 1140) at every point in time. In one embodiment, the switches enable UL signal flow as long as they don't sense power on the DL path. Once DL power is sensed the direction is changed to allow for DL signal flow until the DL power is no longer detected, upon which the direction is turned again to support UL.

The power required by the amplification blocks 1030, 1040, 1130, 1140 could be provided in one of several ways: 1) By incorporating a battery in the antenna unit; 2) By providing a power feed to the antenna unit separate from the coax cable carrying the RF signals; 3) By providing DC powering over the coax cable carrying the RF signals. Multiple amplification blocks 1130, 1140 can share the same power source.

Having active elements in the antenna unit may require the ability to remotely control and monitor the antenna unit, so as to set gain levels or verify the health of the active elements. In one embodiment, the system can provide for in-band telemetry communication between the antenna unit and the wiring closet unit or the source, over the coax at an available frequency band. Alternatively, an additional cable can be provided for the telemetry flow.

In accordance with the invention, a method of providing a DAS can include providing a main frequency multiplexer and separating the downlink signal into one or more frequency ranges. Each of the frequency range can correspond to a section of the antenna. For each frequency range, a connection can be provided and each connection can connect the main frequency multiplexer to a section of the antenna. Where a frequency range includes multiple bands used by services provided by the DAS, a multiband amplifier block 900 can be provided at the corresponding connection for that frequency band. The multiband amplifier block 900 can separate the frequency range according to frequency bands, amplify (or attenuate) those frequency bands that need to be amplified (or attenuated) and combine the frequency bands into a combined signal that travels over the connection to the antenna or the main frequency multiplexer (depending on whether the signal is a downlink signal or an uplink signal, respectively). For each frequency band which needs to be amplified (or attenuated), single band amplifier block can be provided at the corresponding connection for that frequency band or within a multiband amplifier block. The single band amplifier block can separate the signal into uplink and a downlink signal and amplify (or attenuate) the signal and then combine the signal onto the corresponding connection to travel to the antenna or the main frequency multiplexer (depending on whether the signal is a downlink signal or an uplink signal, respectively).

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A distributed antenna system comprising:
a plurality of wireless sources coupled to at least one wiring closet unit;
a first cable run connecting a first wiring closet unit to a first antenna unit;
a second cable run connecting a second wiring closet unit to a second antenna unit;
a first signal measurement component located at a first end of the first cable run and a first equalization component coupled to the first cable run, the first signal measurement component being adapted for receiving a first received signal over the first cable run, wherein the first received signal is generated at a second opposite end of the first cable run by a first measurement signal generation component remotely positioned from the first signal measurement component, and the first signal measurement component for controlling the first equalization component to adjust an amplitude of a signal transferred over the first cable run as a function of the received signal; and
a second signal measurement component and a second equalization component coupled to the second cable run, the second signal measurement component being adapted for receiving a second received signal over the second cable run and for controlling the second equalization component to adjust an amplitude of a signal transferred over the second cable run as a function of the second received signal.

2. A distributed antenna system according to claim 1, wherein the first equalization component adjusts the amplitude of the signal transferred over the first cable run to be substantially the same as the amplitude of the signal transferred over the second cable run as adjusted by the second equalization component.

3. A distributed antenna system according to claim 1, wherein the first antenna unit includes the first measurement signal generation component and a first RF coupler, connecting the first measurement signal generation component to the first cable run.

4. A distributed antenna system according to claim 1, wherein the second antenna unit includes a second measurement signal generation component and a second RF coupler, connecting the second measurement signal generation component to the second cable run.

5. A distributed antenna system according to claim 4, wherein the first antenna unit includes a first RF coupler, connecting the first measurement signal generation component to the first cable run.

6. A distributed antenna system according to claim 1, wherein the first signal measurement component includes
a first power detector adapted to measure a signal power level of the first signal;
a first controller adapted to receive the measure of signal power level of the first signal and for determining a signal level adjustment for the signal transferred over the first cable run.

7. A distributed antenna system according to claim 6, wherein the first equalization component includes a first gain adjustment component for adjusting the signal level of the signal transferred over the first cable run.

8. A distributed antenna system according to claim 6, wherein the second signal measurement component includes
a second power detector adapted to measure a signal power level of the second signal;

a second controller adapted to receive the measure of signal power level of the second signal and for determining a signal level adjustment for the signal transferred over the second cable run.

9. A distributed antenna system according to claim 8, wherein the second equalization component includes a second gain adjustment component for adjusting the signal power level of the signal transferred over the second cable run.

10. A distributed antenna system according to claim 1, wherein the first equalization component is part of the first wiring closet unit.

11. A distributed antenna system according to claim 1, wherein the second equalization component is part of the second wiring closet unit.

12. A distributed antenna system according to claim 1, wherein the first equalization component is part of the first antenna unit.

13. A distributed antenna system according to claim 1, wherein the second equalization component is part of the second antenna unit.

14. A distributed antenna system according to claim 1, wherein the first antenna unit includes
   a first passive antenna element adapted for transferring signals corresponding to a first frequency range;
   a second passive antenna element adapted for transferring signals corresponding to a second frequency range;
   a frequency multiplexer connected to the first passive antenna element by a first connection and connected to the second passive antenna element by a second connection; the frequency multiplexer being adapted for receiving broadband signals and separating the broadband signals into first frequency range signals and second frequency range signals and sending the first frequency range signals over the first connection to the first passive antenna element and sending the second frequency range signals over the second connection to the second passive antenna element; and
   wherein the second connection includes an amplification block adapted to amplify signals communicated between the frequency multiplexer and the second passive antenna element.

15. A method of equalizing signal losses over cable runs in a distributed antenna system, the system comprising two or more antenna units, each connected to an associated wiring closet unit by a cable run, the method comprising:
   generating a measurement signal at a first end of at least one of the cable runs;
   transmitting the measurement signal over at least a portion of the at least one of the cable runs;
   receiving the measurement signal at a second opposite end of the at least a portion of the at least one of the cable runs;
   determining a measure of signal loss over the portion of the at least one cable run; and
   adjusting signal gain of a signal transferred over at least one of the cable runs as a function of the signal loss.

16. A method according to claim 15, wherein the signal gain adjusts an amplitude of the signal transferred over at least one of the cable runs to a predefined signal amplitude at a selected location over the cable run.

17. A method according to claim 15, wherein the signal gain adjusts an amplitude of the signal transferred over at least one of the cable runs to a predefined signal amplitude at an input to one of the antenna units.

18. A method according to claim 15, further comprising
   adjusting the signal gain over two or more cable runs to adjust a signal amplitude at two or more associated antenna units to be substantially a same predefined amplitude.

19. A method according to claim 15, wherein the signal gain adjusts an amplitude of the signal transferred over at least one of the cable runs to a predefined signal amplitude at an input to one of the associated wiring closet units.

20. A method according to claim 15, further comprising
   adjusting the signal gain over two or more cable runs to adjust a signal amplitude at two or more associated wiring closet units to be substantially a same predefined amplitude.

21. The distributed antenna system of claim 1, wherein the first received signal is generated by the first measurement signal generation component periodically.

22. The distributed antenna system of claim 1, wherein the first received signal is generated by the first measurement signal generation component after power up.

23. The distributed antenna system of claim 1, wherein the first received signal and the second received signal are in different frequency bands.

* * * * *